United States Patent Office 3,123,650
Patented Mar. 3, 1964

3,123,650
PROCESS AND CATALYST FOR THE ALKYLATION OF AROMATIC HYDROCARBONS
Thomas Hutson, Jr., and Roy V. Denton, Bartlesville, Okla., assignors to Phillips Petroleum Company, a corporation of Delaware
No Drawing. Filed Apr. 20, 1961, Ser. No. 104,264
7 Claims. (Cl. 260—671)

This invention relates to the alkylation of aromatic hydrocarbons, such as benzene, with an olefin, such as ethylene, utilizing a novel Friedel-Crafts catalyst, and to this improved catalyst system.

The alkylation of aromatic hydrocarbons with olefins using an aluminum halide catalyst, such as anhydrous aluminum chloride, promoted with anhydrous HCl has been in use for some time. The catalyst is actually an aluminum halide-hydrocarbon complex formed in the reaction by reaction of the aluminum chloride with the hydrocarbon or hydrocarbons present in the reaction zone. A similar catalyst system is utilized in the isomerization of paraffin hydrocarbons such as hexane. An essential ingredient of the catalyst system for these reactions is anhydrous HCl which is an expensive source of chloride ion. Another disadvantage of HCl in the system lies in the fact that HCl introduces problems of corrosion, toxicity, and handling. Various substitutes for HCl as a promoter for the catalytic reactions described above have been used and tried but it has been found that they leave something to be desired either from the point of view of the yield of product or the amount of catalyst required in a continuous process. For example, if the addition of HCl is omitted, a small amount of water is added in order to form HCl by hydrolysis of aluminum chloride, the catalyst requirement is greatly increased, and, e.g., in the case of alkylation of benzene with ethylene to form ethylbenzene, the yield of ethylbenzene is reduced by about one-third.

This invention is concerned with a novel and improved catalyst system which is advantageous in the alkylation of aromatics with olefins, in the isomerization of paraffins, and in other reactions in which aluminum halide-hydrocarbon complex catalysts are effective when promoted with HCl.

Accordingly, it is an object of the invention to provide an improved catalyst system effective in the alkylation of aromatic hydrocarbons with olefins and other reactions in which an aluminum halide-hydrocarbon complex is effective when promoted with HCl. Another object is to provide an improved process for alkylating aromatic hydrocarbons, such as benzene, with olefins, such as ethylene, to produce alkylated aromatics. A further object is to provide an improved promoter for aluminum halide-hydrocarbon complex catalysts. It is also an object of the invention to provide effective substitutes for the commonly employed HCl promoter in Friedel-Crafts catalyst systems. Another object is to improve the economy of alkylation when utilizing aluminum chloride-hydrocarbon complex catalysts. Other objects of the invention will become apparent upon consideration of the accompanying disclosure.

This invention is based upon the discovery that mono- and di-chlorobenzenes, when added to an aromatic hydrocarbon alkylation reaction mixture in minor proportion, along with aluminum halide-hydrocarbon complex catalyst, effect high yields of olefin alkylates without the problems of toxicity, corrosion, and handling experienced with HCl. The chlorobenzene promoters are used in a concentration providing an HCl equivalent in the range of 0.1 to 1.0 weight percent of the aromatic hydrocarbon in the reaction mixture. When utilizing a dichlorobenzene, this compound may be ortho, meta, or para. The reactants are alkylatable hydrocarbons, such as benzene, and alkenes of 2 to 14 carbon atoms, preferably 2 to 4 carbon atoms. The alkenes may be straight chain or branched chain. The catalyst system of the invention is particularly effective in alkylating benzene with ethylene to produce ethylbenzene. Other aromatic hydrocarbons may be alkylated to advantage with these novel catalyst systems. Suitable aromatic compounds in addition to benzene, useful in the invention include, for example, hydrocarbons such as ethylbenzene, diethylbenzene, toluene, xylene, and the like. These compounds may likewise be alkylated with olefins of 2 to 14 carbon atoms, including in addition to ethylene, such olefins as propylene, butylene, isobutylene, propylene tetramer, etc.

Although aluminum chloride is the preferred aluminum halide for the reaction, other aluminum halides such as aluminum bromide may be used. While aluminum flouride does not give satisfactory results, mixed halides such as $AlCl_2F$, $AlClF_2$, $AlBr_2F$ and the like may often be used successfully. Methods of preparation of these catalyst components are described in the U.S. patent to Hepp, 2,410,498. Alkylating conditions to be utilized are those conventionally used in the alkylation of aromatics, including a temperature in the range of 50 to 200° F., preferably 140 to 180° F., a pressure from atmospheric to several hundred p.s.i.g., such as 80 to 300 p.s.i.g., and flow rates in the range of 0.7 to 1.5 gallons of total alkylate produced per gallon of catalyst complex per hour. It is generally preferred to operate under a pressure such that the reactant hydrocarbons are present in the reaction zone at least partially in liquid phase. Adequate and intimate mixing of hydrocarbons and catalyst may be obtained by efficient stirrers, by injecting reactants into the reaction zone in jets with stream velocities of 50 to 500 feet per second, etc.

The aluminum chloride-hydrocarbon complex useful in the reaction may be formed in the reaction vessel (alkylator) by introducing the anhydrous aluminum chloride thereto where it is admixed with the benzene or other aromatic feed in the presence of the chlorobenzene. The complex may also be prepared by reacting the aluminum chloride with the hydrocarbon to be alkylated, e.g., benzene, outside of the reactor by contacting these components of the catalyst system in suitable proportions at elevated temperatures, such as within the range of alkylating temperatures to be used, in admixture with or in the absence of the chlorobenzene. The aluminum chloride content of the complex is generally in the range of 25 to 40 weight percent of the complex. The amount of the complex catalyst effective in the process lies in the range of about 0.5 to 2.5 parts by weight per part of aromatic hydrocarbon. A suitable benzene-ethylene weight ratio is in the range of about 4:1 to 7:1, preferably, a ratio of about 6:1 is employed.

The catalyst system of the invention comprises an aluminum halide hydrocarbon complex in admixture with a promoter of the group consisting of monochlorobenzene and dichlorobenzene, the complex having been prepared by reacting the aluminum halide with a hydrocarbon selected from the group consisting of aromatic hydrocarbons and saturated acyclic and alicyclic hydrocarbons containing from 5 to 8 carbon atoms, the promoter being present in an amount providing an HCl equivalent in the range of 0.01 to 0.5 weight percent of the complex. When alkylating benzene the complex is preferably formed by reacting aluminum chloride with benzene in the presence of chlorobenzene, although the promoter may be added after this reaction.

In the following table conditions of alkylating benzene with ethylene are given for the preferred promoter of this invention (column 1) and various prior art promoters for comparison.

TABLE

*Data for Ethylbenzene Synthesis Using AlCl₃-Complex With Benzenemonochloride Promoter*

| Period (Run) | (1) #154 | (2) #146 | (3) Reported | (4) #130 |
|---|---|---|---|---|
| Time in Reactor, Min | 0.41 | 1.3 | -- | 24.3 |
| Time in Settler, Min | 54 | 69 | -- | 31 |
| Reactor Temperature, F | 160 | 161 | 167 | 161 |
| Reactor Pressure, p.s.i.g | 70 | 30 | 3.5 | 20 |
| Benzene/ethylene (Mol) ratio | 4.7 | 4.6 | 2.2 | 4.3 |
| Percent Complex in Effluent | 65 | 56 | 66 | 62 |
| Complex, Wt. Percent AlCl₃ | 30.8 | 28.4 | 30 | 29 |
| Equivalent Cl, Wt. Percent of Benzene | 0.22 | 0.25 | 1.65 | 0.02 |
| AlCl₃, Lb./1,000 Lb. Ethylbenzene | 38.5 | 28.4 | 35 | 65.5 |
| Ethylene Conversion, Percent | 93.9 | 97.7 | 95 | 79.6 |
| Ethylbenzene in Product, Wt. Percent | 99.3 | 93.0 | 99 | 66.4 |

(1) With Benzenemonochloride as promoter.
(2) With ethylchloride as promoter.
(3) Rubber Reserve Report RD-Em5. Anhydrous HCl as promoter.
(4) Test with no promoter added. HCl generated from reaction of water (in solution with benzene) with AlCl₃.

It will be seen from the foregoing table that the monochlorobenzene promoter gives an excellent yield of ethylbenzene. Not only does this promoter form a source of relatively inexpensive chloride ion, but the residue benzene is consumed as one of the reactants in the alkylation.

Certain modifications of the invention will become apparent to those skilled in the art and the illustrative details disclosed are not to be construed as imposing unnecessary limitations on the invention.

We claim:

1. A process for producing alkylated aromatic hydrocarbon which comprises mixing in an alkylating zone an olefin of 2 to 14 carbon atoms, an alkylatable normally liquid aromatic hydrocarbon in addition to the hereinafter named promoter, and a catalyst system consisting essentially of AlCl₃-hydrocarbon complex and a promoter selected from the group consisting of monochlorobenzene and dichlorobenzene; and maintaining alkylating conditions in said zone so as to alkylate said aromatic hydrocarbon.

2. The process of claim 1 wherein said AlCl₃-hydrocarbon complex is in the range of 0.5 to 2.5 parts by weight per part of aromatic hydrocarbon, said AlCl₃ is in the range of 25 to 40 weight percent of said complex, and said promoter being in an amount providing an HCl equivalent in the range of 0.1 to 1.0 weight percent of the aromatic hydrocarbon.

3. The process of claim 2 wherein said aromatic hydrocarbon comprises principally benzene and said olefin comprises principally ethylene, the weight ratio of benzene to ethylene being in the range of 4:1 to 7:1.

4. The process of claim 3 wherein said alkylating conditions include a temperature in the range of 140 to 180° F. and pressure sufficient to maintain reactants in liquid phase.

5. The process of claim 1 wherein said aromatic hydrocarbon comprises principally benzene and said olefin comprises principally ethylene.

6. A catalyst system effective in the alkylation of an aromatic hydrocarbon with an olefin comprising an aluminum chloride-hydrocarbon complex in admixture with a promoter selected from the group consisting of mono-chlorobenzene and dichlorobenzene, said complex having been prepared by reacting aluminum chloride with a hydrocarbon selected from the group consisting of normally liquid aromatic hydrocarbons other than said promoter, and saturated acyclic and alicyclic hydrocarbons containing from 5 to 8 carbon atoms, said promoter being in an amount providing an HCl equivalent in the range of 0.01 to 0.5 weight percent of said complex.

7. The catalyst system of claim 1 wherein said hydrocarbon consists principally of benzene.

References Cited in the file of this patent

UNITED STATES PATENTS

| 2,078,238 | Dreisback | Apr. 27, 1937 |
| 2,756,265 | Hollyday | July 24, 1956 |
| 3,009,003 | Schmerling | Nov. 14, 1961 |

OTHER REFERENCES

Cullinane et al.: Titanium as a Catalyst in the Friedel-Crafts Reaction, Chemical Society Journal, 1954, pages 2942–2947.